United States Patent
Stammers et al.

(10) Patent No.: US 10,764,376 B2
(45) Date of Patent: Sep. 1, 2020

(54) SYSTEM AND METHOD FOR NODE SELECTION BASED ON MID-SESSION AND END-SESSION EVENT INFORMATION

(71) Applicant: CISCO TECHNOLOGY, INC., San Jose, CA (US)

(72) Inventors: Timothy P. Stammers, Raleigh, NC (US); Suraj Sharad Mody, Kirkland, WA (US); Robert Glenn Smith, Voisins le Bretonneux (FR)

(73) Assignee: Cisco Technology, Inc., San Jose, CA (US)

(*) Notice: Subject to any disclaimer, the term of this patent is extended or adjusted under 35 U.S.C. 154(b) by 332 days.

(21) Appl. No.: 15/296,885

(22) Filed: Oct. 18, 2016

(65) Prior Publication Data

US 2018/0109632 A1    Apr. 19, 2018

(51) Int. Cl.
*H04L 29/08* (2006.01)
*H04L 29/06* (2006.01)
(Continued)

(52) U.S. Cl.
CPC ........ *H04L 67/148* (2013.01); *H04L 12/1407* (2013.01); *H04L 12/4633* (2013.01);
(Continued)

(58) Field of Classification Search
CPC ............... H04L 67/148; H04L 12/1407; H04L 12/4633; H04L 47/825; H04L 64/203;
(Continued)

(56) References Cited

U.S. PATENT DOCUMENTS 8,520,615 B2 * 8/2013 Mehta ................... H04W 8/082
370/329
8,560,708 B2 * 10/2013 Nelakonda .............. H04L 12/00
709/228

(Continued)

FOREIGN PATENT DOCUMENTS

EP    2466828 A1    6/2012

OTHER PUBLICATIONS

U.S. Appl. No. 15/083,001, filed Mar. 28, 2016, entitled "Consolidated Control Plane Routing Agent," Inventor(s): Timothy P. Stammers, et al.
(Continued)

*Primary Examiner* — Philip J Chea
*Assistant Examiner* — Robert B McAdams
(74) *Attorney, Agent, or Firm* — Patterson+Sheridan, LLP

(57) ABSTRACT

In one embodiment, a method comprises obtaining, by a first network element comprising processing logic, notification of a plurality of events associated with a plurality of communication sessions, wherein the events include at least one of a mid-session event or an end-session event, wherein the plurality of events are communicated to a routing agent using a first communication protocol by a plurality of second network elements; receiving, by the first network element, a request via a second communication protocol for a first communication session to be established for a client computing device; selecting, by the first network element, one or more network elements from the second network elements for the communication session based on the at least one of
(Continued)

a mid-session or an end-session event; and communicating, by the first network element, identification information of the one or more network elements selected for use in the first communication session.

18 Claims, 9 Drawing Sheets

(51) Int. Cl.

| | | |
|---|---|---|
| *H04L 29/12* | (2006.01) | |
| *H04W 48/18* | (2009.01) | |
| *H04L 12/46* | (2006.01) | |
| *H04L 12/14* | (2006.01) | |
| *H04L 12/803* | (2013.01) | |
| *H04W 28/08* | (2009.01) | |
| *H04W 88/16* | (2009.01) | |
| *H04L 12/917* | (2013.01) | |

(52) U.S. Cl.
CPC .......... *H04L 47/125* (2013.01); *H04L 61/203* (2013.01); *H04L 65/102* (2013.01); *H04L 65/1016* (2013.01); *H04L 65/1066* (2013.01); *H04L 65/1069* (2013.01); *H04L 65/1083* (2013.01); *H04L 67/1004* (2013.01); *H04L 67/1031* (2013.01); *H04W 48/18* (2013.01); *H04L 47/76* (2013.01); *H04L 65/1033* (2013.01); *H04L 67/14* (2013.01); *H04W 28/08* (2013.01); *H04W 88/16* (2013.01)

(58) Field of Classification Search
CPC ............... H04L 65/1016; H04L 65/102; H04L 65/1066
See application file for complete search history.

(56) References Cited

U.S. PATENT DOCUMENTS

| | | | | |
|---|---|---|---|---|
| 8,855,071 | B1* | 10/2014 | Sankaran | H04W 76/11 |
| | | | | 370/329 |
| 8,923,260 | B2* | 12/2014 | Gundavelli | H04W 8/02 |
| | | | | 370/338 |
| 2011/0075675 | A1 | 3/2011 | Koodli et al. | |
| 2014/0341109 | A1* | 11/2014 | Cartmell | H04L 45/308 |
| | | | | 370/328 |
| 2016/0360458 | A1* | 12/2016 | Lubenski | H04W 76/12 |

OTHER PUBLICATIONS

3GPP Organizational Partners, "3$^{rd}$ Generation Partnership Project Technical Specification: Group Services and System Aspects; General Packet Radio Service (GPRS) enhancements for Evolved Universal Terrestrial Radio Access Network (E-UTRAN) access (Release 13)," Dec. 2015, 337 pages.

"Configuring Load Balancing on the GGSN," *Cisco IOS Mobile Wireless Configuration Guide*, First Published on or about Feb. 2014, 26 pages; http://www.cisco.com/c/en/us/td/docs/ios/12_2/12_2y/12_2yw/ggsn40/cfg1/ggsn40_c/ggsnslb.pdf.

"F5 Traffic Signaling Delivery Controller Data Sheet: Control and Optimize Your 4G LTE Network With Diameter Signaling Management," F5 Networks, Inc., 401 Elliott Avenue West, Seattle, WA; Feb. 2014, 11 pages; http://www.f5.com/pdf/products/signaling-delivery-controller-datasheet.pdf.

Notification of Transmittal of the International Search Report and the Written Opinion of the International Searching Authority, or the Declaration for Application No. PCT/US2017/056161 dated Jan. 31, 2018.

* cited by examiner

SYSTEM AND METHOD FOR NODE SELECTION BASED ON MID-SESSION AND END-SESSION EVENT INFORMATION

TECHNICAL FIELD

This disclosure relates in general to the field of communications and, more particularly, to node selection based on mid-session and end-session event information.

BACKGROUND

A service provider's cellular network may provide client computing devices with access via one or more communication sessions to various networks attached to the cellular network, such as the Internet, an Internet Protocol Multimedia Subsystem (IMS) network, an enterprise network, or other network. These networks may provide various services to the endpoints, such as voice services (e.g., Voice over Internet Protocol) or other media services.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
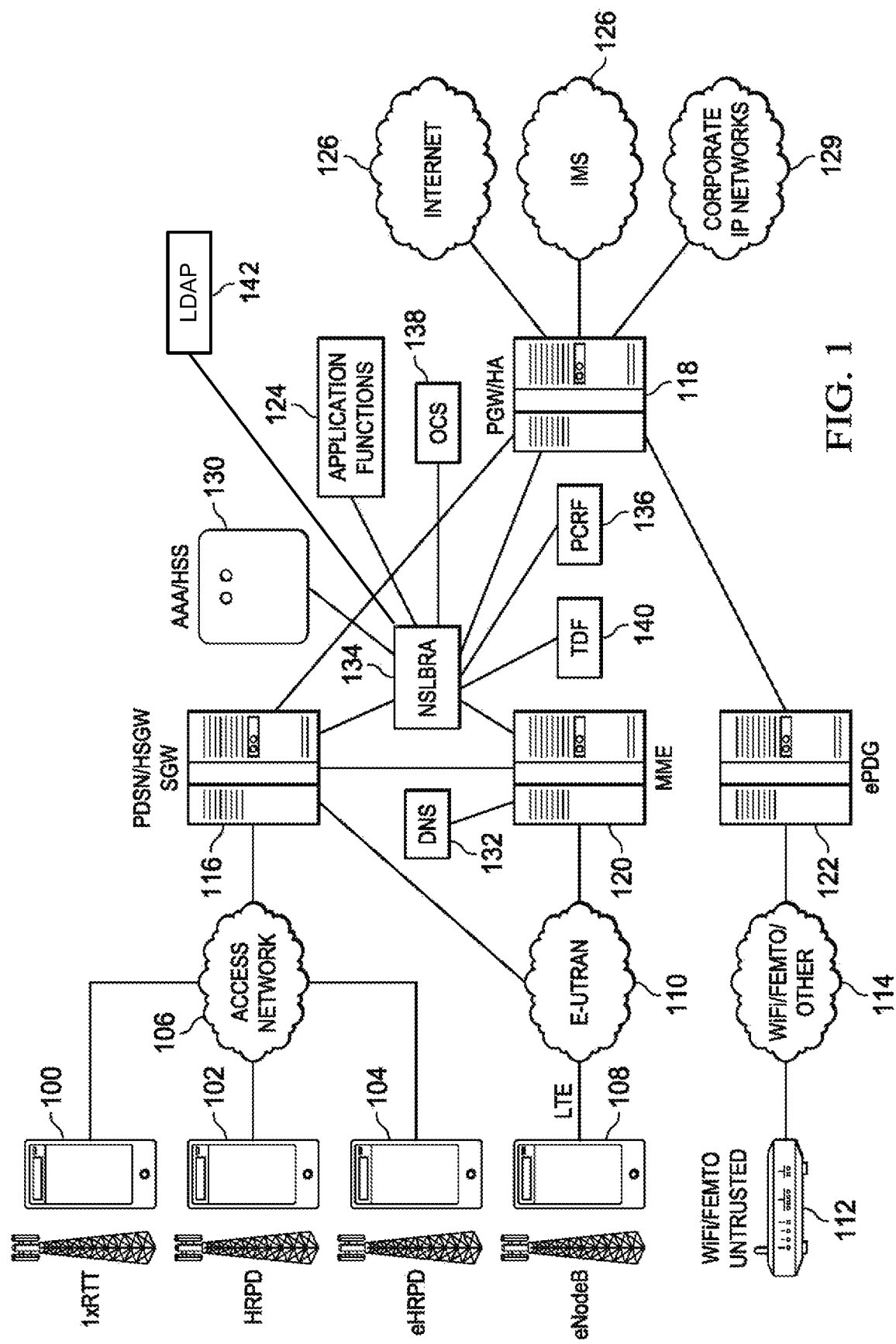
FIG. 1 illustrates a communication network that includes a consolidated control plane load balancer and routing agent in accordance with certain embodiments.

In one embodiment, a method comprises obtaining, by a first network element comprising processing logic, notification of a plurality of events associated with a plurality of communication sessions, wherein the events include at least one of a mid-session event or an end-session event, wherein the plurality of events are communicated to a routing agent using a first communication protocol by a plurality of second network elements; receiving, by the first network element, a request via a second communication protocol for a first communication session to be established for a client computing device; selecting, by the first network element, one or more network elements from the second network elements for the communication session based on the at least one of a mid-session or an end-session event; and communicating, by the first network element, identification information of the one or more network elements selected for use in the first communication session.

Example Embodiments

In various embodiments of the present disclosure a consolidated control plane load balancer and routing agent is able to determine state information of various network elements in a communication network using a first protocol. In particular embodiments, the state information may include mid-session and/or end-session events of various communication sessions associated with the network elements. The consolidated control plane load balancer and routing agent may receive a request to create a communication session for a client computing device via a second protocol. The consolidated control plane load balancer and routing agent may select one or more network elements for the communication session based on the state information it has collected from messages of the first protocol. The consolidated control plane load balancer and routing agent may then communicate the selected network elements such that the session may be established and may utilize the selected network elements. In various embodiments, the consolidated control plane load balancer and routing agent may also select one or more network elements for migration of an existing communication session or multiple communication sessions (e.g., when performing load rebalancing) to one or more network elements based on the state information.

Various embodiments offer numerous technical advantages such as reducing the amount of messaging required to administer a communication session by using the same network elements for multiple sessions of a client computing device, steering communication sessions to network elements that can optimally service the communication sessions (thus potentially increasing the overall bandwidth of the network), avoiding the overloading of particular network elements, improving reliability (since in some embodiments the consolidated control plane load balancer and routing agent does not remain in the communication path for the session), reducing the amount of messaging required to take network elements offline, preventing the assignment of a network element that is offline or scheduled to go offline to a requested session, and other technical advantages.

FIG. 1 illustrates a communication network that includes a consolidated control plane load balancer and routing agent 134 in accordance with certain embodiments. The network may include any suitable number of radio access technologies such as a 1xRTT transceiver 100, a high-rate packet data (HRPD) transceiver 102, and an evolved high-rate packet data (eHRPD) transceiver 104. Each of the radio access technologies can connect to an access network 106. The network may also include an evolved Node B (eNodeB) transceiver 108, which is an LTE network radio network component that connects to an Evolved UMTS Terrestrial Radio Access Network (E-UTRAN) 110. Other radio access technologies such as WiFi, Femto, WiMAX, or any other radio spectrum technology can use transceiver 112 to connect to the network using a broadband or other access network.

The radio access technologies may provide network connectivity to various client computing devices (also referred to herein as user equipment (UE)). A client computing device may be any suitable computing devices operable to send and receive network traffic (e.g., data packets). The client computing devices may connect directly to a wireless transceiver of the communication network or through one or more intermediate devices such as a mobile or cellular router, switch, residential gateway, fixed mobile convergence product, home networking adapter, Internet access gateway, set-top box, or other suitable computing device. In various embodiments, the client computing devices may connect wirelessly to the communication network or may connect through one or more wires to the communication network.

In various embodiments, a "computing device" (such as a client computing device or other network element depicted in the figures or otherwise described herein) may be or comprise, by way of non-limiting example, a cellular telephone, IP telephone (e.g., an enterprise IP phone that uses SIP to communicate voice data), smart phone, computer, tablet computer, workstation, server, mainframe, embedded computer, embedded controller, embedded sensor, personal digital assistant, laptop computer, convertible tablet computer, computing appliance, network appliance, virtual machine, virtual appliance, or any other electronic, microelectronic, or microelectromechanical device for processing and communicating data. A computing device may include an appropriate operating system, such as Microsoft Windows, Linux, Android, Mac OSX, Apple iOS, Unix, or similar operating system.

The communication network of FIG. 1 may include various network elements (e.g., 116, 118, 120, 122, 130, 132, 134, 136, 138, 140, and 142) that provide functionality of the communication network. Any one of these network elements may reside within one or more discrete computing devices or two or more network elements may be combined together within the same computing device. The network elements may communicate with each other in any suitable manner.

The access network 106 may communicate with an access gateway 116 that implements any combination of functionalities such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA) and a mobility management entity (MME) 120. On the access network side, the anchor gateway 118 can also communicate with an evolved packet data gateway (ePDG) 122 which provides connectivity to the WiFi/Femto/other transceiver 112. On the packet core side, the anchor gateway can communicate with the operator's IP service domain 124, the internet 126, IP multimedia subsystem (IMS) 128, or other network or application function. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a UE. Even when the UE is detached from the network, the HSS 130 maintains the binding information until the UE re-attaches itself and updates the binding information. HSS 130 may sometimes be collocated with an Authentication, Authorization, and Accounting (AAA) server that can provide authentication, access control, and accounting to the network. The authentication can involve verification of the subscriber, the access control can involve granting or denying access to specific services, and the accounting can track the use of network resources by subscribers. Other servers, such as the Home Location Register (HLR) can be used in other embodiments. In certain embodiments, the AAA/HSS 130 can communicate with the access gateway 116 for charging purposes.

An LTE communication network may include a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communication network includes the MME 120, SGW 116, and PGW 118 components. In some embodiments, one or more EPC components can be implemented on the same gateway or chassis.

The SGW 116 sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW 118 acts as the interface between the LTE network and other packet data networks, such as the Internet or SIP-based IMS networks (fixed and mobile). As described in further detail later, the PGW can be modified to support UE-initiated framed routes. The PGW serves as the anchor point for intra-3GPP network mobility, as well as mobility between 3GPP and non-3GPP networks. The PGW may act as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW may perform policy enforcement, packet filtering for each user, charging support, lawful interception, and packet screening. The PGW also provides an anchor for mobility between 3GPP and non-3GPP technologies such as WiMAX and 3GPP2 standards (CDMA 1x and EVDO).

The MME 120 may reside in the control plane of the LTE core network (e.g., EPC) and manages session states, authentication, paging, mobility with 3GPP 2G/3G nodes, roaming, and other bearer management functions. The MME 120 can be a standalone element or integrated with other core network elements, including, e.g., the SGW 116, PGW 118, and Release 8 Serving General Packet Radio Service (GPRS) Support Node (SGSN). The MME 120 can also be integrated with 2G/3G elements, such as the SGSN and GGSN. This integration may facilitate mobility and session management interworking between 2G/3G and 4G mobile networks.

The MME 120 is a control-node for the LTE access network. The MME 120 is responsible for UE tracking and paging procedures including retransmissions. The MME 120 handles the bearer activation/deactivation process and is also responsible for choosing the SGW for a UE (e.g., SGW 116) at the initial attachment and at time of an intra-LTE handover as well as selecting an appropriate PGW (e.g., PGW 118). The MME 120 also authenticates the user by interacting with the HSS 130. The MME 120 also generates and allocates temporary identities to UEs and terminates Network Access Server (NAS) signaling. The MME 120 checks the authorization of the UE to camp on the service provider's Public Land Mobile Network (PLMN) and enforces UE roaming restrictions. The MME 120 is the termination point in the network for ciphering/integrity protection for NAS signaling and handles the security key management. Lawful interception of signaling is also supported by the MME 120. The MME 120 also provides the control plane function for mobility between LTE and 2G/3G access networks with the S3 interface terminating at the MME 120 from the SGSN (not shown). The MME 120 also terminates the S6a interface towards the home HSS 130 for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW 118 when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Policy and Charging Rules Function (PCRF) 136 may determine policy rules in the network. PCRF 136 may access subscriber databases and other specialized functions (e.g., a charging system) in a centralized manner. PCRF 136 may support the creation of rules and policy decisions for each active subscriber on the network. PCRF 136 may be integrated with one or more other components of the LTE core network or may operate as a stand-alone entity.

Online Charging System (OCS) 138 facilitates charging of customers of a service provider based on service usage and may be a termination point for charging. In various embodiments, OCS may implement an event based charging function (EBCF) that is used to charge events based on occurrence (as opposed to duration or volume of data used in association with the event). For example, the EBCF may track and charge SMS or MMS messages or the purchase of content, such as multimedia content, an application, or a game. In various embodiments, OCS may implement a session based charging function (SBCF) for online charging of sessions (e.g., voice calls, IMS sessions, IP Connectivity Access Network (IP CAN) sessions, or other sessions). In various embodiments, the OCS may track account balances for various subscribers.

Traffic Detection Function (TDF) 140 may provide accurate traffic data to other network elements (e.g., PCRF 136 and OCS 138). TDF 140 may identify subscriber-application traffic and enable policy-based QoS actions, charging actions, and/or traffic steering to be applied to the traffic flows in real time. TDF 140 may employ advanced flow inspection and analysis algorithms that identify data traffic per application, per subscriber, and/or per network topology. In various embodiments, TDF 140 may communicate real-time traffic intelligence to the PCRF 136 and OCS 138, enabling policy decisions and charging actions to be taken by these network elements.

Domain name system (DNS) 132 may include mappings of logical names of network elements to network addresses (e.g., IP addresses) of the network elements. During establishment of a communication session for a client computing device, the MME 120 or other network element may query the DNS 132 to determine the address of one or more other network elements that may assist in the establishment of the session. For example, the DNS 132 may provide the addresses of one or more SGWs, PGWs, or other network elements that may be used in the establishment of the session. In various embodiments of the present disclosure, when queried in connection with establishment of a session for a UE, DNS 132 may respond with one or more addresses of one or more consolidated control plane load balancer and routing agents (e.g., node selector/load balancer routing agent (NSLBRA) 134).

LDAP 142 represents a Lightweight Directory Access Protocol server comprising a database storing directory service information regarding users, networks, applications, services, and/or systems. LDAP 142 may provide any suitable set of records, such as email addresses or other contact information (e.g., of an organization), a set of usernames and passwords, encryption certificates, or other directory related information to requesting entities. In various embodiments, LDAP 142 may be compliant with all or a portion of Internet Engineering Task Force (IETF) Request for Comments (RFC) 4511, Version 3.

NSLBRA 134 represents an example consolidated control plane load balancer and routing agent. NSLBRA 134 may communicate with one or more network elements using a first protocol and one or more other network elements using a second protocol. In a particular embodiment, the first protocol is a signaling protocol used for messages relating to authentication, authorization (e.g., policy enforcement), and/or accounting (e.g., charging) for subscribers of a communication network. For example, the first protocol may be a Diameter-based protocol including any of the characteristics described in IETF RFC 6733, a Remote Authentication Dial-In User Service (RADIUS) based protocol including any of the characteristics described in RFC 2865 and/or RFC 2866, or other similar protocol. A Diameter-based protocol may encompass messages according to one or more Diameter Applications, such as Diameter Mobile IPv4 Application (RFC 4004), Diameter Network Access Server Application (RFC 4005), Diameter Extensible Authentication Protocol Application (RFC 4072), Diameter Credit-Control Application (RFC 4006), Diameter Session Initiation Protocol Application (RFC 4740), or other suitable Diameter Application. In general, a packet of a Diameter-based protocol comprises a Diameter header and a variable number of Attribute-Value Pairs (AVPs) that include encapsulated information relevant to the Diameter message.

In various embodiments, the NSLBRA 134 is a routing agent in the communication network for messages of the first protocol. That is, NSLBRA 134 may receive from network elements messages that are destined for other network elements and may route the messages to the other network elements. In various embodiments, the NSLBRA 134 is a centralized routing agent that is coupled between a plurality of network elements such as at least one MME, PCRF, PCEF, HSS, HLR (e.g., via SS7 signaling), OCS, TDF, GGSN, SGSN, PGW, SGW, P-CSCF, I-CSCF, S-CSCF, LDAP server, or other suitable network element. In various embodiments, the centralized routing agent may be compatible with any suitable network element interface, such as s6a, S9, S13, Sd, Sy, Rx, Gx, Gy, Gz, Rf, Ro, St, or other suitable network interface. In various embodiments, a communication interface of the NSLBRA 134 that communicates using the first protocol includes a plurality of ports that may each be coupled to one or more network elements. The centralized placement of the routing agent may offer many features, such as simplified network management, load balancing and failover assurance, congestion control, improved security, vendor interoperability, and session binding.

If multiple different network elements of the same type can handle particular requests made via the first protocol, the routing agent may load balance the requests across the network elements to prevent network element overload or service interruptions. If one of the network elements becomes unavailable, the routing agent may direct requests to the other network element(s). In various embodiments, the routing agent may throttle requests if the destination network element is congested, thus protecting against DoS attacks. In various embodiments, the routing agent may also enhance security by providing topology hiding in order to mask the address of a network element from another network element. For example, a gateway may not need to know the address of an OCS or PCRF it is to communicate with, but only needs to know the address of the NSLBRA in order to communicate with the OCS or PCRF. Typical network elements that are hidden by the routing agent may include the HSS, MME, and PCRF (though any suitable network element may be hidden). In some embodiments, a migration of a session from a first network element or set of network elements (e.g., a PCRF and/or PGW) to a second network element or set of network elements (e.g., a different PCRF and/or different PGW) may be hidden from various network elements (e.g., a RAN, MME, DNS and/or a UE) involved in the communication session by the NSLBRA 134. In some situations, if such migration were not hidden from these network elements, session continuity could be negatively affected by the migration of the network elements (e.g., PGW and/or PCRF). In various embodiments, the routing agent may perform address resolution (e.g., for a PCRF, HSS, OCS, etc.).

The routing agent may also provide interoperability for legacy networks, e.g., by serving as an intermediary between network elements that communicate using the first protocol and network elements that communicate using a different (e.g., legacy) protocol (e.g., Mobile Application Part (MAP)). In various embodiments, this may involve manipulation of AVPs of messages of the first protocol.

In various embodiments, the routing agent may also perform session binding to ensure that once a particular network element is selected for a session, the necessary messages are sent to the selected network element. For example, a session (e.g., an IP-CAN session or PDP context) may be bound to the same policy server (e.g., PCRF 136), since separately addressable policy servers may be resident in some communication networks. The session may be bound to the same network element (e.g., PCRF) for multiple interfaces (e.g., the Gx interface between a PCRF and a PGW and the Rx interface between the PCRF and an application function). As another example, if OCS 138 is assigned to a session, billing records associated with that session may be communicated to OCS 138.

In a particular embodiment, the NSLBRA includes a Diameter Routing Agent (DRA) which may include any of the characteristics specified in 3GPP TS 29.213. A DRA is a functional element in a 3G or 4G (e.g., LTE) network that provides real-time routing capabilities to ensure that messages are routed among the correct elements in a network. The DRA may provide any suitable functionalities described above with respect to the routing agent.

In various embodiments, the NSLBRA 134 collects and stores state information associated with various network elements by inspecting messages of the first communication protocol received from the various network elements. Such state information may include whether a particular subscriber has any active communication sessions (e.g., PDP contexts, IP-CAN sessions, or other communication sessions) with the communication network, which network elements are involved in such communication sessions, or other suitable state information.

In various embodiments, the state information may include information obtained from mid-session and end-session events. A mid-session event may be an event that occurs with respect to a communication session while the communication session is active. In various embodiments, a mid-session event may be a mobility event in which a communication session is migrated from one or more network elements to one or more other network elements. As various examples, a mid-session event may indicate a change in a radio access technology used to access a core network (e.g., a change between LTE and WiFi or any other radio spectrum technology), a change in the PLMN (e.g., a UE may leave the coverage area of a home PLMN to a visited PLMN when roaming), a change in an access network gateway (AN-GW), a change in location of a UE, a charging ToD event indicating a change in charging posture, a message indicative of a data or time quota associated with the subscriber and/or session, or other suitable event. Any of these events (or other mid-session mobility events) may result in a change in the set of network elements used to service the communication session. For example, a particular network element that serviced the communication session may cease to be used for the communication session and a different network element may service the communication session in response to the event.

An end-session event may be an event that signifies the end of a communication session (and the accompanying release of resources used by the network elements servicing the communication session). An end-session event may be detected in any suitable manner. For example, an end-session event may be detected based on a message received by the routing agent of NSLBRA 134 (e.g., the message may be sent from one network element to another network element via the routing agent). As just one example, the message may comprise a Credit Control Request (CCR) message having a CC-Request-Type of "termination". As another example, an end-session event may be based on a timeout. In one embodiment, a timer is started by the NSLBRA 134 when a communication session is established. The timer may also be restarted in response to a detection of activity associated with the communication session (e.g., via messages associated with the communication session that are received by the routing agent of NSLBRA 134). If the timer expires (indicating that the communication session has been inactive for a large amount of time), the session may be torn down (e.g., the NSLBRA 134 may send one or more messages instructing the teardown of the communication session). Thus, an end-session event may include a timeout event.

In a particular embodiment, the state of communication sessions (e.g., whether one or more active communication sessions exist for a particular UE and which network elements are servicing active communication sessions) and/or the number of communication sessions being serviced by each of various network elements may be ascertained based on events indicated by messages of the first communication protocol sent by any of the network elements to one or more other network elements via NSLBRA 134. For example, such messages may include messages sent over a Gx interface between a PGW and a PCRF. In various embodiments, these messages may include CCR, Credit Control Answer (CCA), Re-Auth-Request (RAR) Command, and/or Re-Auth-Answer (RAA) Command messages sent via a Diameter-based protocol. Various parameters of these messages which may be used to determine the state of one or more communication sessions are described in 3GPP TS 29.212 V14.1.0 (2016-09) which is hereby incorporated by reference. As one example, the state information may be extracted by a routing agent of the NSLBRA 134 from one or more messages sent at the time of establishment of a communication session that indicate session establishment events (e.g., CCR messages having a CC-Request-Type of "initial"), one or more messages sent during the communication session that indicate one or more mid-session events (e.g., CCR messages having a CC-Request-Type of "update"), and/or one or more messages sent during termination of the communication session that indicate one or more end-session events (e.g., CCR messages having a CC-Request-Type of "termination").

The NSLBRA 134 may use the state information collected from messages of the first protocol to select network elements for communication sessions. In particular embodiments, the state information may be used to select one or more network elements for a communication session requested via a second protocol (e.g., at the time of session establishment). A request for the communication session may be made using any suitable protocol. In particular embodiments, the second protocol is a tunnel establishment protocol, such as a GPRS Tunneling Protocol (GTP)-based protocol (e.g., GTPv0, GTPv1, or GTPv2), an IKE-based protocol (e.g., IKEv2), or other suitable tunnel establishment protocol. In various embodiments, any protocol allowing for communication session requests may be used. In various embodiments, the NSLBRA 134 may receive a message in compliance with the second protocol. For example, the NSLBRA 134 may receive a message in accordance with the second protocol that includes a create session request (e.g., a request to create a communication session for a UE). In other embodiments, the NSLBRA 134 may receive a message created in response to a message in compliance with the second protocol. For example, the NSLBRA 134 may receive a request for selection of network elements from a network element (e.g., MME), wherein the request is generated in response to the network element receiving a create session request message in compliance with the second protocol.

In various embodiments, one or more network elements are selected for a communication session at the time the communication session is established based on state information obtained by the NSLBRA 134 based on session establishment events (e.g., events relating to establishment of communication sessions), mid-session events, and/or end-session events detected by the NSLBRA 134. Similarly, one or more network elements may be selected for an established communication session based on similar information when a determination is made to migrate the communication session from one or more network elements to the selected one or more network elements (e.g., during load rebalancing of existing communication sessions).

Any suitable network elements may be selected (either during session establishment or during session migration) by the NSLBRA 134 based on the state information collected via the first protocol. For example, the NSLBRA 134 may select a PGW, an SGW, and/or a PCRF for a session requested by a UE. In particular embodiments, the selection of multiple network elements for a session may be performed in response to reception of a single message (e.g., a create session request) received by the NSLBRA 134 from another network element (e.g., MME 120). For example, a PGW and an SGW may be selected for a session requested by a UE in response to the NSLBRA 134 receiving a create session request message (or other message generated by another network element in response to that network element receiving a create session request message). As another example, a PGW, SGW, and a PCRF may be selected for a session in response to a received message. Any other suitable combination of network elements may be selected for a session in response to a received message (e.g., a TDF, OCS, P-CSCF, a gateway node or other node of a packet data network, an application function, an LDAP server, etc.). Various embodiments wherein the NSLBRA selects network elements for a requested communication session has various advantages over a DNS-based approach for selection of network elements. For example, such embodiments make network element sandboxing or temporary removal (e.g., for maintenance) easier since DNS records do not have to be changed. Similarly, any of these network elements may be selected in response to a determination that a session should be migrated to one or more of these network elements.

In various embodiments, the selection of one or more network elements for a communication session may be based on information included in the request for the communication session. For example, an identifier of the UE (e.g., an International Mobile Subscriber Identity (IMSI)) and/or an identifier associated with an endpoint of the desired connection (e.g., an APN) may be used in the selection of the one or more network elements. In particular embodiments, the relevant state information collected via the first protocol may be identified based on information included in the request for the communication session for the UE. For example, the NSLBRA 134 may determine whether a UE has any active sessions by determining whether the identifier of the UE (e.g., IMSI) is associated with any records of active sessions detected based on state information collected via the first protocol.

If the NSLBRA 134 determines that the UE already has one or more active communication sessions, the NSLBRA 134 may select one or more network elements being used in one or more of the active communication sessions for the current session being requested (wherein the determination of which network elements are being used in the active session(s) of the UE may be indicated by session establishment events, mid-session events, and/or end-session events detected by the routing agent of the NSLBRA 134). For example, if the UE has an active communication session with a particular packet data network (PDN) and that session is using a particular SGW, PGW, and PCRF, the NSLBRA 134 may select the same SGW, PGW, and/or PCRF for use in the requested session. Reusing the same network elements for additional communication sessions provides various benefits including simplified administration of billing and policies (e.g., a policy for the UE could be applied across multiple sessions with different packet data networks). In various embodiments, network elements (e.g., the PCRF) may be preselected at the time that the create session request message is received by the NSLBRA, rather than after an anchor point (e.g., a PGW) for the session receives a request to create the session.

In various embodiments, by basing the selection of the one or more network elements on mid-session and/or end-session events, the NSLBRA 134 is able to make better decisions in comparison to a scheme that only utilizes session establishment events, as the NSLBRA 134 is able to track the active sessions of the UE, thus ensuring that the same network elements are used for new sessions established for the UE, even if the active sessions have been migrated over to different network elements after their establishment.

As alluded to above, the state information obtained from the mid-session and end-session events may also be used in migrating one or more active sessions to accomplish a rebalancing among network elements (and/or a redistribution of the weighting applied to each network element by a load balancer of the NSLBRA 134 when selecting network elements for new sessions). The rebalancing and/or redistribution of the weighting may occur in response to any suitable trigger, such as a determination that one or more network elements are unavailable, a message indicating that one or more network elements are to be unavailable in the future, a determination that one or more particular network elements are overloaded or are expected to be overloaded based on current and/or expected conditions, a determination that one or more particular network elements are underutilized or are expected to be underutilized based on current and/or expected conditions, a determination that the RAT used by a UE has changed (e.g., a different set of network elements may be used for a 4G RAT than are used for a 3G RAT or Wi-Fi), a change in location of the UE (e.g., an OCS or other network element(s) may be changed in response to a determination that the UE has entered a roaming area), or other suitable trigger.

The weighting of available network elements may be based on any suitable information, such as the distribution of sessions on the network elements, knowledge of the expected rate of charging events over particular interfaces (e.g., the Gx interface), or other suitable information.

In particular embodiments, a session may be migrated from one or more network elements to one or more other network elements in response to the routing agent of the NSLBRA 134 receiving a message from a network element (e.g., an Application Function 124 or other suitable network element) requesting a service that is unsupported by the one or more network elements currently servicing the communication session. As one example, a session may be established using a first PCRF and a first PGW. After the session has been established, an Application Function 124 (or other network element) may send a message to another network element (e.g., a PCRF over the Rx interface) requesting a service in association with the communication session that is not supported by one or more network elements (e.g., a PCRF and/or PGW) currently servicing the communication session. As one example, the Application Function may request a service that requires a lower latency than the current network elements (e.g., PCRF and/or PGW) are unable to provide. In response to receiving this message, the NSLBRA 134 may determine that the current network element(s) are unable to provide the requested service, may select network element(s) that are able to provide the requested service, and may initiate the migration of the communication session to the selected network element(s) by sending one or more messages to one or more network elements.

In various embodiments, because the NSLBRA 134 collects state information via the first protocol, the NSLBRA 134 does not have to track (e.g., store) the create session requests received via the second protocol (i.e., it does not have to implement a stateful load balancing approach) in order to determine whether a session for the particular UE may exist, since that information is available via the messages received in the first protocol. The NSLBRA 134 also does not need to be in the data path of the communication session once it is established (e.g., to track whether the communication session is still active), though in various embodiments, the NSLBRA 134 may remain in the data path (e.g., to hide network topology or monitor load on network elements).

Once the NSLBRA 134 has selected one or more network elements for the session, the NSLBRA 134 may notify one or more other network elements of the selection. In a particular embodiment, the NSLBRA 134 may forward the received create session request to one of the selected network elements (e.g., the selected SGW) in a message in accordance with the second protocol (e.g., a GTPv2 message). In particular embodiments, the forwarded create session request may also include an identification (e.g., a network address or Fully Qualified Domain Name (FQDN)) of one or more other network elements that were selected for the session (e.g., the selected PGW). In another embodiment, the NSLBRA 134 may reply to the create session request with an indication (e.g., a network address or FQDN) of the one or more network elements that were selected for the session.

In various embodiments, in response to receiving a create session request via the second protocol, the NSLBRA 134 may select one or more network elements for the session (e.g., a PCRF, OCS, TDF, or other element described herein) and store the selection. The NSLBRA may later receive one or more messages (e.g., via the first protocol) requesting an indication of one or more network elements to be used for the session. In various embodiments, such messages may comprise a CCR message having a CC-Request-Type of "initial", an Sd Session Establishment message, or similar message requesting selection of a PCRF, OCS, TDF, and/or other network element. The NSLBRA 134 may respond to this message with an indication of one or more network elements that were selected at the time the create session request was received. In various embodiments the NSLBRA 134 does not select a P-CSCF, but ensures that an Rx interface request (associated with a particular PDN connection for a given APN) from a P-CSCF is sent to the same PCRF that was chosen to host a session of the first protocol (e.g., a Diameter session) when the PDN connection for the given APN was first created.

When one or more network elements are selected for a communication session that is already active (e.g., for migration), these network elements may be indicated to one or more network elements in any suitable manner to cause the selected network elements to be used for the communication session. For example, when a communication session is migrated from a first network element to a second network element, the NSLBRA 134 may send a message to the first network element, the second network element, both the first network element and the second network element, and/or to a different network element (which may communicate with one or both of the network elements to effectuate the migration) in order to initiate the migration. In various embodiment, when a communication session is migrated from a first network element to a second network element, the NSLBRA 134 may send a message to one or more other network elements informing them of the migration. For example, if a session is migrated from one PCRF to another PCRF, a message indicating the change in PCRF may be sent to the PGW serving the session to allow the PGW to communicate with the new PCRF for the migrated session.

In addition to selecting network elements for communication sessions, the NSLBRA 134 may also prioritize messages routed by the routing agent based on the information it receives via the first protocol. For example, the NSLBRA 134 may determine, based on the messages it receives, that a particular UE has used up its available quota (e.g., a bandwidth quota) and may deprioritize messages of the first protocol that are associated with communication sessions of the UE. For example, the NSLBRA 134 could delay the routing of messages associated with communication sessions of the UE in favor of messages associated with other UEs (e.g., that have not used up their quota). Alternatively, the NSLBRA 134 could select one or more network elements to service the communication sessions in place of the network elements currently servicing the communication sessions (e.g., the selected network element(s) may provide lower performance).

In various embodiments, the NSLBRA 134 may use additional information (alone or in conjunction with state information collected via messages complying with the first protocol) to select one or more network elements for the session. For example, short term factors such as load factors (e.g., CPU, memory usage, and/or number of active session being handled by the network elements), geography of the network elements with respect to the UE and/or each other, knowledge of whether a network element is offline or scheduled to be offline, costs associated with the session, time of day, software versions of network elements, available default billing and policy behaviors appropriate for the session and UE, roaming considerations (e.g., partner-specific P-termination), latency associated with the network elements, service level agreements, or other factors. In a particular embodiment, a network element may be chosen based on the IMSI and/or the APN to be used in the session. For example, a PGW and/or SGW may be selected based on a mobile country code (MCC) and/or mobile network code (MNC) included in the IMSI and/or the APN to be used. In various embodiments, particular PGW and SGW pairings may be identified to be used for a subset of possible APNs. In certain embodiments, selection of a policy server (e.g., PCRF) may be based on availability of various policy servers, priority between groups of policy servers, and/or weights of particular policy servers within a group. In particular embodiments, the selection of particular elements by the NSLBRA 134 may be influenced by the selection of one or more other elements by the NSLBRA. For example, the selection of the TDF, OCS, and/or application function may be based on the particular PCRF chosen for the session.

The networks described herein may be any suitable network or combination of one or more networks operating on one or more suitable networking protocols. A network may represent a series of points, nodes, or network elements and interconnected communication paths for receiving and transmitting packets of information that propagate through a communication system. For example, a network may include one or more firewalls, routers, switches, security appliances, antivirus servers, or other useful network devices. A network offers a communicative interface between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment depending on the network topology. A network can comprise any number of hardware or software elements coupled to (and in communication with) each other through a communications medium. In some embodiments, a network may be as simple as a connection such as a cable (e.g., an Ethernet cable), air, or other transmission medium. In various embodiments, any suitable network may connect one network element to another network element.

In various embodiments, the UE may request a session with a network coupled to the service provider's communication network, such as Internet 126, an IMS network 128, a corporate IP network 129, or other network.

Internet 126 comprises a global system of interconnected computer networks to which various devices using any suitable protocols may be attached. In its current state, Internet 126 comprises a large number of computing devices linked together using the Internet protocol suite (TCP/IP). Internet 126 provides many various resources and services, such as inter-linked hypertext documents and applications of the World Wide Web (WWW), electronic mail, telephony, peer-to-peer file sharing networks, and numerous other resources.

IMS network 128 may comprise components adapted to provide control of any suitable IP multimedia services (e.g., VoIP, instant messaging, videoconferencing, video on demand, etc.) to client computing devices. In various embodiments, IMS network 128 may rely on a Session Initiation Protocol (SIP) based protocol as a signaling mechanism, thereby allowing voice, text and multimedia services to traverse networks coupled to IMS network 128. As an example, a SIP-based protocol may include any combination of the characteristics described, e.g., in RFC 2543 or RFC 3261. In an embodiment, IMS network 128 may include a control plane based on a SIP infrastructure and a user plane based on Real-time Transport Protocol (RTP). In various embodiments, IMS network 128 may enable real-time consumer and enterprise communication services over a variety of access technologies, including LTE, Wi-Fi, High Speed Packet Access (HSPA), or other suitable access technology. In various embodiments, IMS network 128 may include one or more of a Proxy Call Session Control Function (P-CSCF), a Serving Call Session Control Function (S-CSCF), an Interrogating Call Session Control Function (I-CSCF), a Breakout Gateway Control Function (BGCF), or an Emergency Call Session Control Function E-CSCF. IMS network 128 may include any other suitable components in other embodiments. The P-CSCF is the entry point to IMS network 128 and may serve as the outbound proxy server for a UE. A UE attaches to the P-CSCF before performing IMS registrations and initiating SIP sessions. The P-CSCF may forward SIP messages to other elements of IMS network 128. For example, the P-CSCF may route incoming SIP messages to an IMS registrar server hosted by S-CSCF. The P-CSCF may also generate charging data records (CDRs), maintain a security association with the UE (e.g., by setting up IPSec Security associations with UEs), may authorize bearer resource QoS via an Application Function toward PCRF 136, may facilitate the provision of local services (e.g., 411 or emergency calls), may provide lawful interception, may compress SIP headers, or perform any other suitable functions. The network elements of IMS network 118 may include any suitable logic, such as one or more computer systems, network processing units, line cards, packet and voice processing cards, or other suitable logic.

Corporate IP networks 129 may comprise one or more networks belonging to one or more particular entities, such as a company, government, education institution, or other group and may comprise one or more LANs or other networks.

Application Functions (AFs) 124 may represent one or more networks or devices that may reside in the data plane and/or control plane of a communication session. An AF may perform any suitable services, such as establishing the quality of service and/or charging aspects for a service provided to a UE; requesting that certain QoS and/or charging resources be made available to the UE; applying QoS parameters (e.g., bandwidth parameters) for video streaming, voice calls, web browsing, or other data usage; performing Web and/or video optimization techniques in concert with other network elements (e.g., the PCRF and PGW) when such optimization is needed (e.g., when the network is congested), or other suitable functions. In various embodiments, an AF may extract session information (e.g., subscriber identifier, IP address of the UE, bandwidth, media type/format, flow description such as source and destination IP addresses and communication protocol, flow status, and/or other suitable information) from signaling and provide the information to the PCRF. In various embodiments, an AF may comprise a pool of servers or instances that are each operable to provide the services of the AF. In such embodiments, NSLBRA 134 may be operable to select one of these servers or instances for the communication session at the time of session establishment. In particular embodiments, an AF may comprise a P-CSCF of an IMS network, a server comprising policies set by a third party to the subscriber and the service provider (e.g., a content provider), or a video streaming server.

Figure 2:
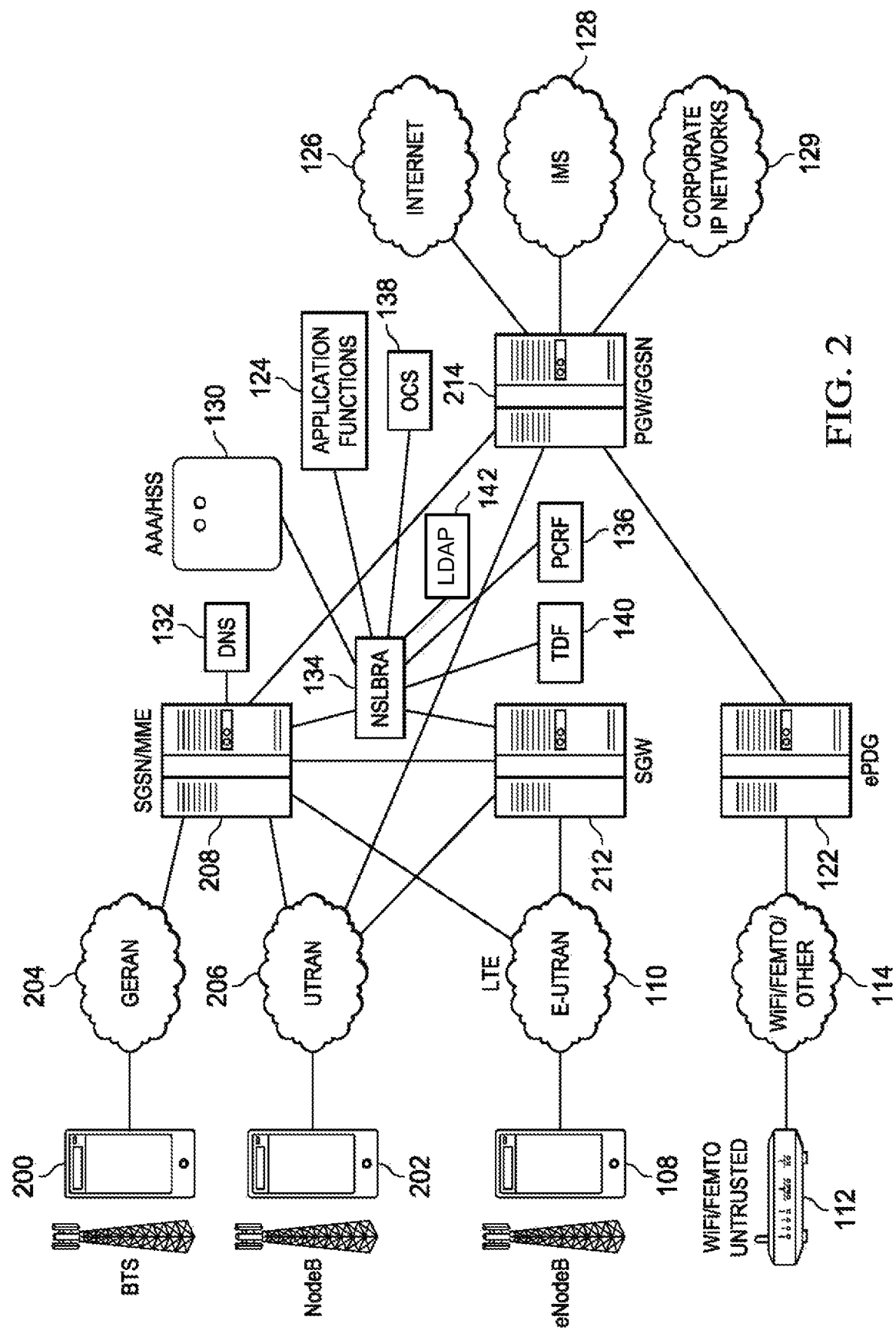
FIG. 2 illustrates another communication network that includes a consolidated control plane load balancer and routing agent in accordance with certain embodiments.

FIG. 2 illustrates another communication network that includes a consolidated control plane load balancer and routing agent 134 in accordance with certain embodiments. The network elements of FIG. 2 may have any suitable characteristics described above with respect to the corresponding network elements in FIG. 1. The communication network may include legacy transceivers, such as base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

The various gateways (e.g., 214) can access and maintain information relating to the communication session, the subscriber, the radio bearers, and the policies relating to the communication session. The gateways (e.g., 214) may be used to provide various services to a mobile device and implement the quality of service (QoS) on packet flows. Several of these functions are used in providing, for example, voice over IP (VoIP) routing and enhanced services, such as enhanced charging, stateful firewalls, and traffic performance optimization (TPO). The communication networks also allow the provision of applications such as VoIP, streaming video, streaming music, mutli-user gaming, location based services, and a variety of content delivered to a mobile node. The various gateways may include any suitable logic, such as one or more computer systems, network processing units, line cards, packet and voice processing cards, or other suitable logic.

Figure 3:
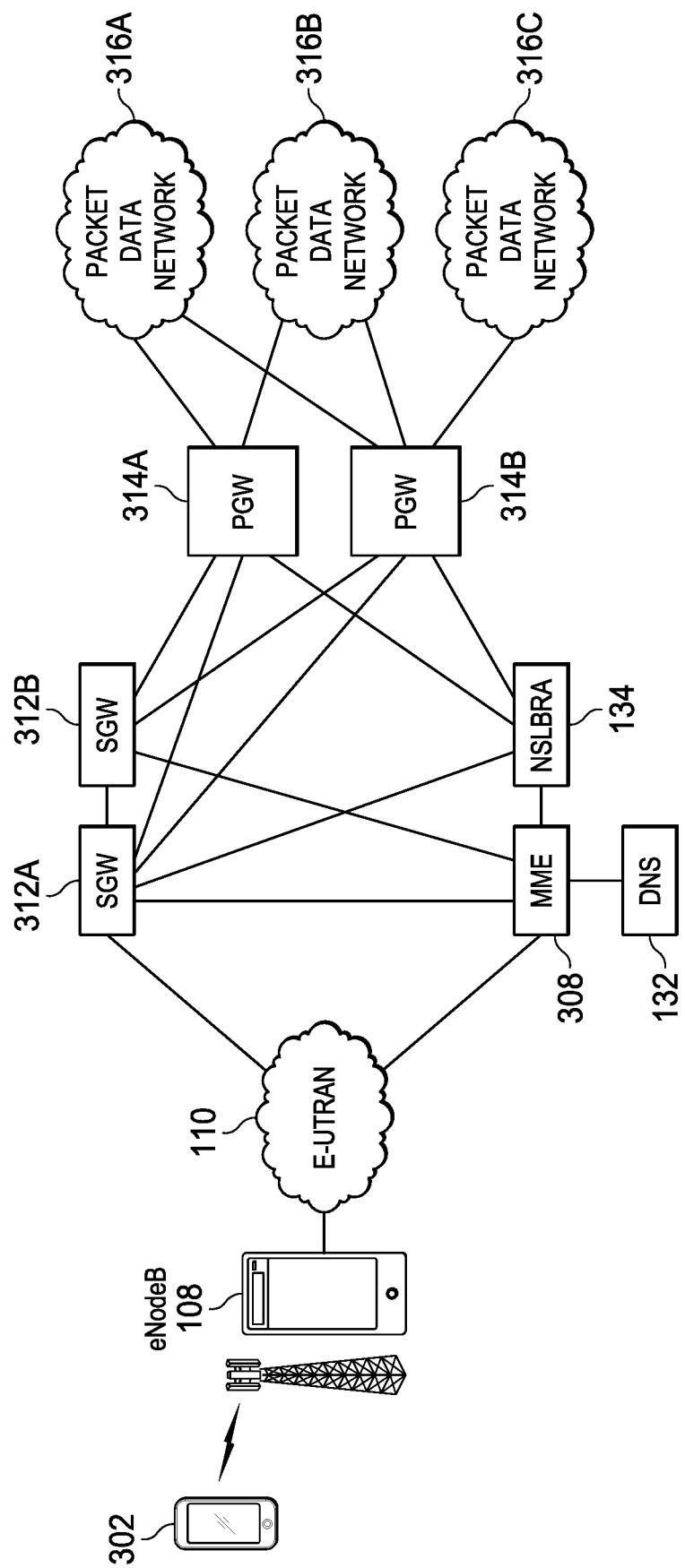
FIG. 3 illustrates another communication network that includes a consolidated control plane load balancer and routing agent and candidate network elements in accordance with certain embodiments.

FIG. 3 illustrates another communication network that includes a consolidated control plane load balancer and routing agent (NSLBRA 134) and candidate network elements 312 and 314 in accordance with certain embodiments. The communication network includes a client computing device 302, eNodeB 108, E-UTRAN 110, a plurality of SGWs 312, a plurality of PGWs 314, a plurality of packet data networks 316, an MME 308, a DNS 132, and NSLBRA 134. The SGWs, PGWs, and MME may have any suitable characteristics of other SGWs, PGWs, and MMEs described herein. In the embodiment depicted, device 302 may initiate a communication session with any of the packet data networks 316. Any of these communication sessions may use any suitable combination of an SGW and a PGW. In various embodiments, if the client computing device 302 has an active session to a packet data network (e.g., 316A) through a particular SGW (e.g., 312A) and PGW (e.g., 314A), when the device 302 requests an additional communication session to another packet data network (e.g., 316B), the NSLBRA 134 may be notified of the request and may select the same SGW (e.g., 312A) and PGW (e.g., 314A) for the new communication session. In some embodiments, if other information indicates that the SGW or PGW is undesirable for the new session (e.g., if the NSLBRA 134 knows that the SGW or PGW is offline or scheduled to go offline), the NSLBRA 134 may select a different, more desirable SGW or PGW. Similar determinations may be made for any of the network elements selected for the session (e.g., PCRF, etc.).

Figure 4:
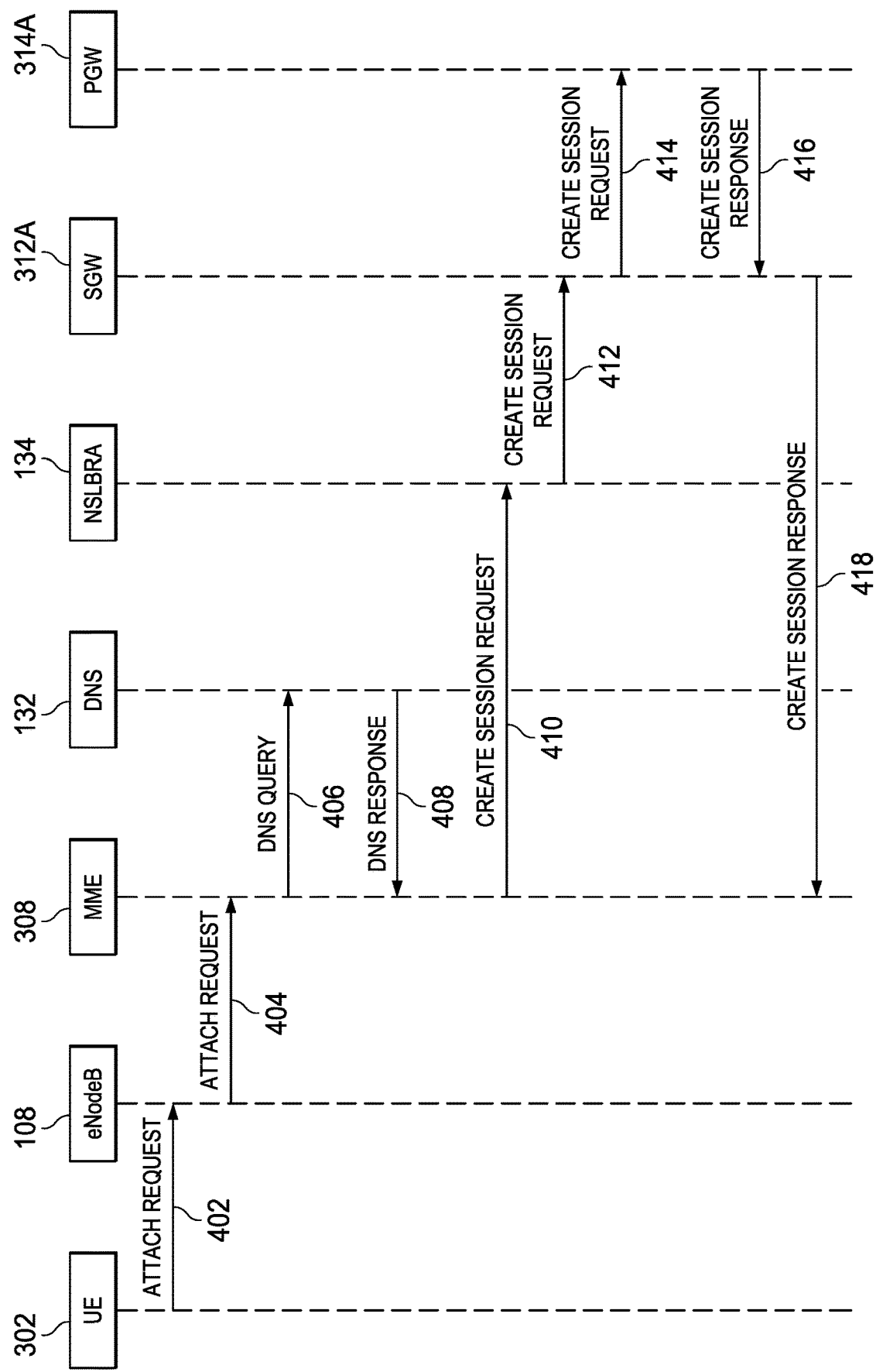
FIG. 4 illustrates a portion of an example call flow for selecting network elements for a communication session of a client computing device in accordance with certain embodiments.

FIG. 4 illustrates a portion of an example call flow for selecting network elements for a communication session of a client computing device 302 in accordance with certain embodiments. The various messages are examples only, and other messages may be used. For example, a full call flow may include additional messages not depicted in FIG. 4. In addition, each operation may include one or more messages communicated between the various network elements (or other suitable network elements).

At 402, the UE sends an attach request message to the eNodeB. The attach request message may include a request to create a session with a communication network. In particular embodiments, the attach request message may include an identification of the communication network. For example, the attach request may include an Access Point Name identifying a gateway for the communication network of the desired session. In some embodiments, the attach request does not specify a particular communication network for the desired session. In such cases the MME (or other network element) may contact another network element (e.g., an HSS) to identify a default APN. In various embodiments, the attach request message may include any other suitable information, such as the location of the UE. At 404, the attach request message is forwarded to the MME. At 406, the MME performs one or more DNS queries to a DNS server. In typical call flow, a DNS query may be used to request an identifier (e.g., a network address or FQDN) of an SGW and/or PGW. Once the MME receives one or more DNS responses to the one or more DNS queries, the MME may send a create session request message (including various information from the attach request message and additional information) to the SGW identified in the DNS response. In various embodiments of the present disclosure, instead of an identifier of an SGW and/or PGW, the DNS response at 408 includes an identifier of an NSLBRA 134 (it could optionally include multiple identifiers of NSLBRAs that may be used). In particular embodiments, the DNS response may also include a list of one or more SGWs or PGWs that may be used for the connection (e.g., to be used in case the MME is unable to obtain an SGW or PGW from an NSLBRA).

At 410, the MME sends the create session request message to the NSLBRA identified in the DNS response. The create session request could also be a create PDP request (e.g., in GTPv1 and GTPv0) or other suitable message requesting establishment of a communication session for a UE. The create session request may include any suitable information for use in establishment of the session. For example, the create session request message may include an identifier of the UE (e.g., an IMSI), the location of the UE, an identifier of the network the UE is requesting a session with (e.g., an APN), a priority associated with the UE, or other suitable information.

The NSLBRA selects an SGW and a PGW (and perhaps other network elements) for the session and then forwards the create session request to the selected SGW along with an indication of the selected PGW at 412. The SGW forwards the create session request to the identified PGW at 414. In response to receiving the create session request from the SGW, the PGW may establish a session with the appropriate PCRF instance (which may also be selected by the NSLBRA) using the first protocol (e.g., Diameter) with the NSLBRA acting as a routing agent between the PGW and PCRF. The PGW may the send a create session response via the SGW to the MME indicating the success of the session establishment at 416.

Some of the operations illustrated in FIG. 4 may be repeated, combined, modified or deleted where appropriate, and additional operations may also be included. Additionally, operations may be performed in any suitable order without departing from the scope of particular embodiments.

Figure 5A:
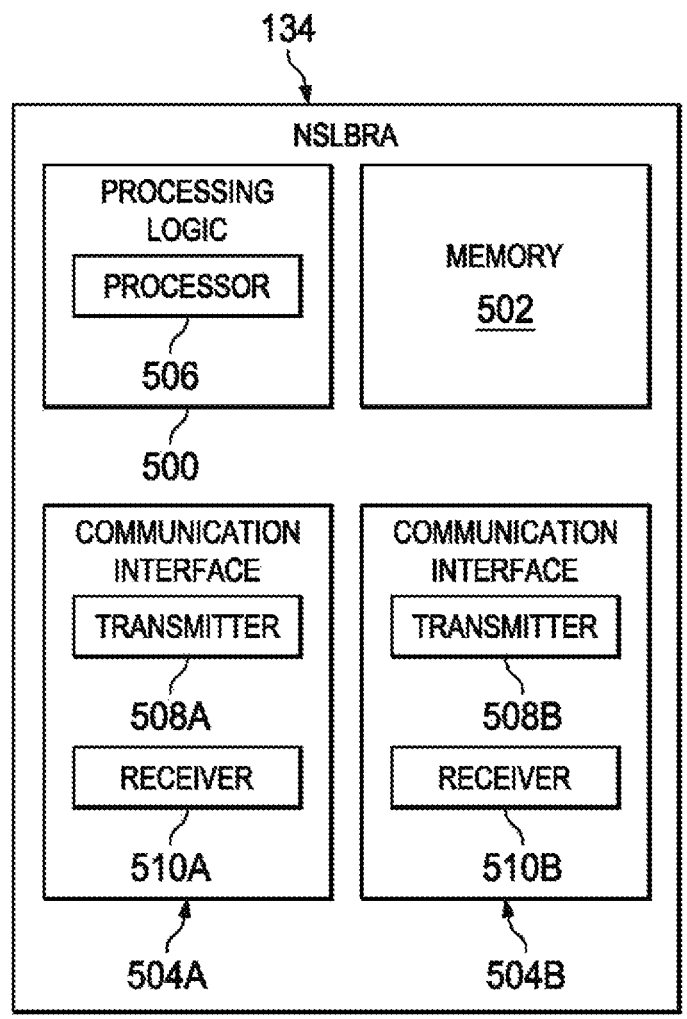
FIG. 5A illustrates an example consolidated control plane load balancer and routing agent in accordance with certain embodiments.

FIG. 5A illustrates an example consolidated control plane load balancer and routing agent (e.g. NSLBRA 134) in accordance with certain embodiments. In various embodiments, the routing agent may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein. The components of the one or more computer systems may comprise any suitable physical form, configuration, number, type, and/or layout. Where appropriate, one or more computer systems may be unitary or distributed, span multiple locations, span multiple machines, or reside in a cloud, which may include one or more cloud components in one or more networks.

In the embodiment depicted, the routing agent includes a computer system to facilitate performance of its operations. In particular embodiments, a computer system may include a processor, memory, and one or more communication interfaces, among other components. As an example, NSLBRA 134 comprises a computer system that includes processing logic 500 (including one or more processors 506 and other logic), one or more memories 502, and one or more communication interfaces 504. These components may work together in order to provide functionality of their respective systems as described herein.

Processor 506 may be a microprocessor, controller, or any other suitable computing device, resource, or combination of hardware, stored software and/or encoded logic operable to provide, either alone or in conjunction with other components of their constituent devices, the functionality of the respective devices. In some embodiments, NSLBRA 134 may utilize multiple processors to perform the functions described herein. The processor may execute any type of instructions to achieve the operations detailed herein in this Specification. In one example, the processing logic could transform an element or an article (e.g., data) from one state or thing to another state or thing.

In various embodiments, the processing logic (e.g., the processor or other logic of the processing logic) may comprise any suitable fixed logic or programmable logic (e.g., software/computer instructions executed by the processor) such as a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof to perform the functions described herein.

Memory 502 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. The memory may store any suitable data or information utilized by its constituent device, including software embedded in a computer readable medium, and/or encoded logic incorporated in hardware or otherwise stored (e.g., firmware). The memory may also store the results and/or intermediate results of the various calculations and determinations performed by its associated processor or other processing logic.

A communication interface 504 may be used for the communication of signaling and/or data between NSLBRA 134 and one or more networks and/or network elements coupled to the NSLBRA through a network or other communication channel. For example, the communication interface may be used to send and receive network traffic such as data packets. A communication interface may send and receive data and/or signals according to any suitable standard such as Asynchronous Transfer Mode (ATM), Frame Relay, Gigabit Ethernet (or other IEEE 802.3 standard), IEEE 802.11 standard, or other suitable wireline or wireless standard.

A communication interface may include any suitable logic. In the embodiment depicted, each communication interface includes a transmitter 508 and a receiver 510. Transmitter 508 may include any suitable logic to receive data and transmit a representation of the data over a communication channel. Receiver 510 may include any suitable logic to receive transmitted data and provide the received data to one or more other components of NSLBRA 134. In various embodiments, the transmitter 508 may include one or more of a source encoder (e.g., to compress source data), a channel encoder (e.g., to introduce redundancy into data to be transmitted in order to overcome noise and interference in the communication channel), or a digital modulator (e.g., to map a binary information sequence into a signal waveform). In various embodiments, the receiver 510 may include one or more of a digital demodulator (e.g., to process a received waveform and reduce the waveform to an estimation of a transmitted data symbol), a channel decoder (e.g., to use the redundancy in the transmitted data to fill in positions where the demodulator couldn't resolve a waveform), or a source decoder (e.g., to receive a signal and use knowledge about encoding performed by the source encoder to reconstruct the original information).

In the embodiment depicted, NSLBRA 134 depicts two different communication interfaces 504A and 504B (though NSLBRA may include any number of communication interfaces). In various embodiments, interface 504A is operable to communicate with other network elements using the first protocol described above (e.g., a Diameter or RADIUS based protocol) and interface 504B is operable to communicate with other network elements (e.g., the MME, SGW, etc.) using the second protocol described above (e.g., a GTP based protocol). Each communication interface 504 may have any suitable number of ports that are each coupled to one or more other network elements.

In one embodiment, the NSLBRA 134 may include a routing agent and a load balancer/node selector combined in the same device. For example, the routing agent and load balancer/node selector may share hardware (e.g., processors, memory, communication interfaces, and/or a physical housing, etc.). In another embodiment, the NSLBRA 134 may include a routing agent with its own dedicated hardware (e.g., processor(s), memory, communication interface(s), and/or physical housing, etc.) and a load balancer/node selector with its own dedicated hardware. In various embodiments, the routing agent and load balancer/node selector of the NSLBRA 134 are able to communicate any suitable data with each other.

In various embodiments, any of the network elements or other devices described herein may include a computer system having any of the components described above for performing the functionality of the respective network elements or other devices.

Figure 5B:
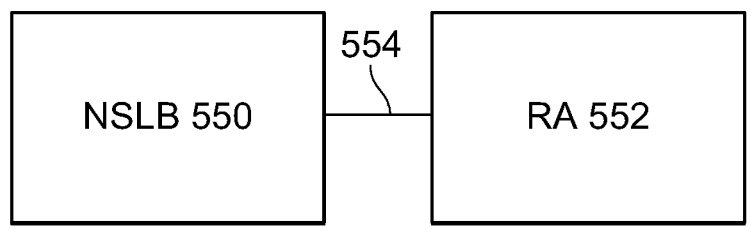
FIG. 5B illustrates an example control plane load balancer and an example routing agent in accordance with certain embodiments.

FIG. 5B illustrates an example node selector and load balancer (NSLB 550) and an example routing agent (RA 552) in accordance with certain embodiments. In the embodiment depicted, the NSLB 550 and routing agent 552 are not collocated, but rather are coupled via connection 554 (which may include any suitable transmission media and/or networks).

NSLB 550 may include a computer system having any of the components described above with respect to NSLBRA 134 for performing any of the node selection and load balancing functions described herein. Similarly, RA 552 may include a computer system having any of the components described above with respect to NSLBRA 134 for performing any of the routing functions described herein. For example, NSLB 550 may include a communication interface similar to 504B and RA 552 may include a communication interface similar to 504A. In various embodiments, NSLB 550 and/or RA 552 may include an additional communication interface enabling communication with each other. In a particular embodiment, NSLB 550 may include a communication interface enabling communication via the first protocol with RA 552.

In various embodiments (including an embodiment where the NSLB 550 and routing agent 552 are not collocated), the NSLB 550 may subscribe to various session establishment events, mid-session events, and/or end-session events by sending the RA 552 one or more messages indicating which events the NSLB 550 is to be notified of. The RA 552 may store an indication of the events and may communicate these events to the NSLB. The RA 552 may forward the original messages that indicate such events (e.g., CCR messages) or may extract event information from the original messages and send the extracted event information to the NSLB 550. In various embodiments, the RA 552 may aggregate information associated with multiple different events before sending the aggregated information to the NSLB 550 in order to reduce the bandwidth used. The NSLB 550 may use the event information to select network elements for new and/or existing communication sessions as described herein. A similar subscription mechanism could be used in a consolidated NSLBRA 134.

Figure 6:
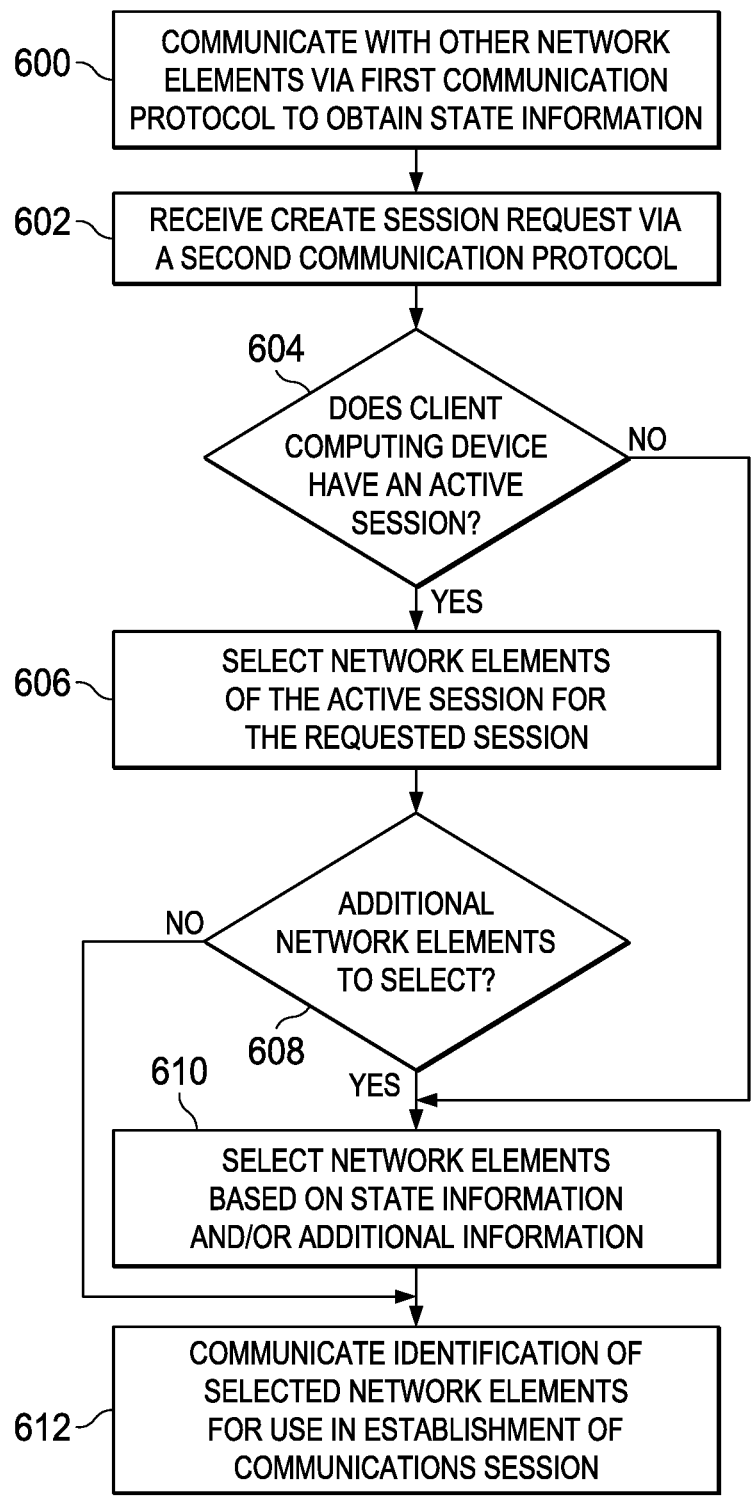
FIG. 6 illustrates an example flow for selecting network elements for a communication session of a client computing device in accordance with certain embodiments.

FIG. 6 illustrates an example flow for selecting network elements for a communication session of a client computing device (e.g., 302) in accordance with certain embodiments. The operations of the flow may be performed by any suitable network element, such as NSLBRA 134.

At 600, an NSLBRA 134 communicates with other network elements via a first communication protocol to obtain state information of the other network elements. In various embodiments, the NSLBRA 134 may gather this information by inspecting messages that are sent to the NSLBRA 134 in the NSLBRA's capacity as a routing agent. In particular embodiments, this state information may be based on mid-session and/or end-session events indicated in the messages. At 602, a create session request is received via a second communication protocol. At 604, the NSLBRA determines whether a client computing device identified in the create session request has an active communication session. In various embodiments, such determination may be made by looking at state information about one or more network elements that was gathered by the NSLBRA 134 through messages of the first protocol. As one example, the NSLBRA may identify an identifier (e.g., an IMSI) of the UE that is included in the create session request and may determine whether a network element (e.g., a PGW) is being used for a session for the particular identifier.

If the client computing device does not have an active communication session, the flow may skip to 610 where network elements are selected based on any available state information and/or additional information known about the available network elements or the UE. As examples only, the NSLBRA may select network elements for the session based on the locations of the UE and/or network elements, the priority of the UE, or the current load on the network elements.

If the UE does have an active session, one or more network elements being used for the UE's active session may be selected for use in the requested session at 606. The NSLBRA 134 may then determine whether additional elements are to be selected for the session. If so, the additional elements are selected based on state information and/or additional information at 610. An identification of the selected network elements are communicated for use in the establishment of the requested session at 612. These network elements may be communicated in any suitable manner. For example, a network element may be notified that it has been selected for use in the communication session when it receives a forwarded create session request message from the NSLBRA or other network element. As another example, a selected network element may be notified via a message of the first protocol sent by the NSLBRA or other network element to the selected network element.

Some of the operations illustrated in FIG. 6 may be repeated, combined, modified or deleted where appropriate, and additional operations may also be included. Additionally, operations may be performed in any suitable order without departing from the scope of particular embodiments.

Figure 7:
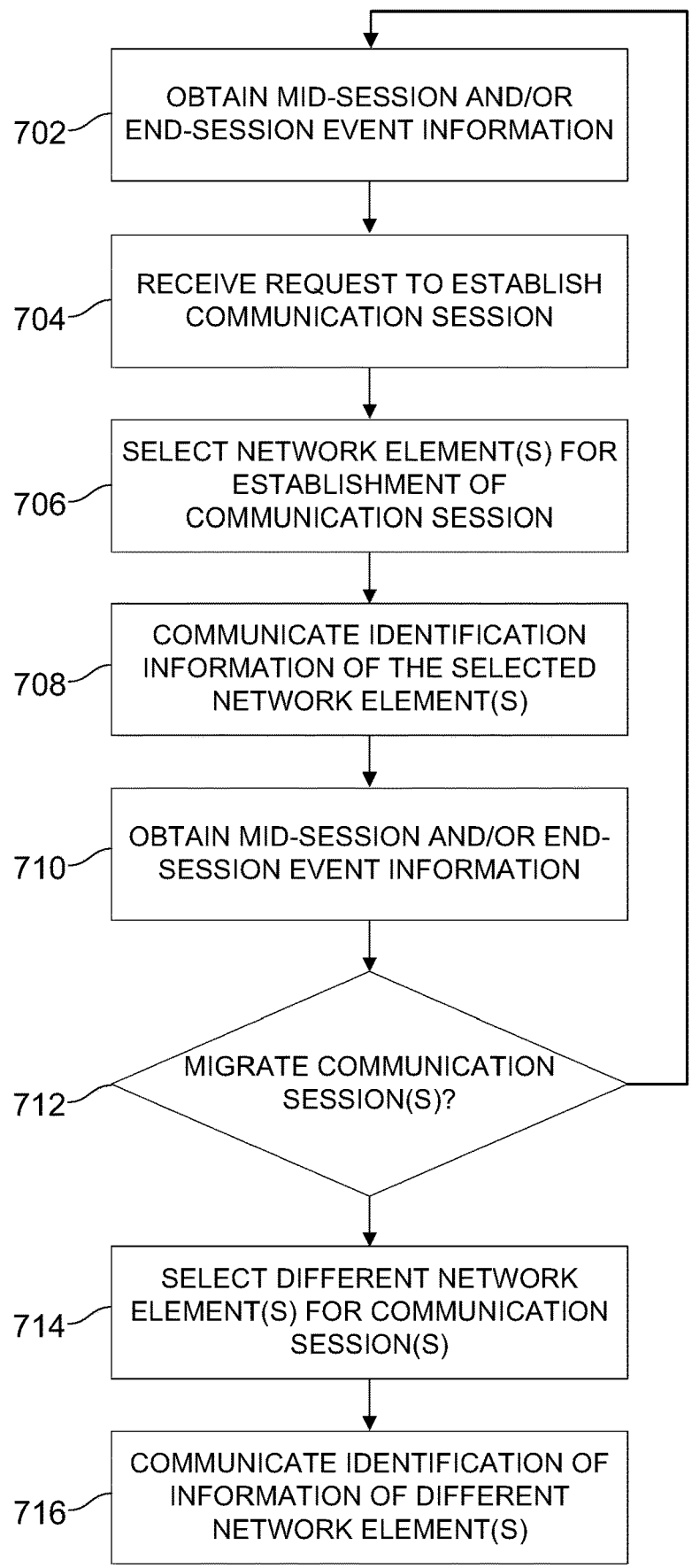
FIG. 7 illustrates another example flow for selecting network elements for a communication session of a client computing device in accordance with certain embodiments.

FIG. 7 illustrates another example flow for selecting network elements for a communication session of a client computing device (e.g., 302) in accordance with certain embodiments. The operations of the flow may be performed by any suitable network elements, such as NSLBRA 134 or NSLB 550 and RA 552.

At 702, mid-session and/or end-session event information is obtained. For example a routing agent may obtain such information via messages the routing agent routes between network elements. At 704, a request to establish a communication session is received. In various embodiments, the request is received by a node selection function implemented by NSLBRA 134 or NSLB 550. At 706, one or more network elements may be selected for the establishment of the communication session (e.g., by NSLBRA 134 or NSLB 550). In various embodiments, the selection may be based, at least in part, on the mid-session and/or end-session event information obtained. At 708, identification of the selected network element(s) is communicated such that the selected network element(s) can be used to service the communication session.

At 710, additional mid-session and/or end-session event information is obtained. At 712, a determination is made as to whether one or more active communication sessions should be migrated. The determination may be based upon any suitable information, such as the mid-session and/or end-session event information, any of the triggers described above, or other suitable information. If a determination is made that no active communication session should be migrated, the flow may return to 710. If a determination that one or more active communication sessions should be migrated is made, one or more different network elements are selected for the communication sessions to be migrated (the network elements selected could differ between the sessions that are to be migrated or may be common among two or more sessions). At 714, identification information of the different network element(s) is communicated to the relevant network element(s) to cause the session(s) to be migrated to the different network elements.

Some of the operations illustrated in FIG. 7 may be repeated, combined, modified or deleted where appropriate, and additional operations may also be included. Additionally, operations may be performed in any suitable order without departing from the scope of particular embodiments.

Figure 8:
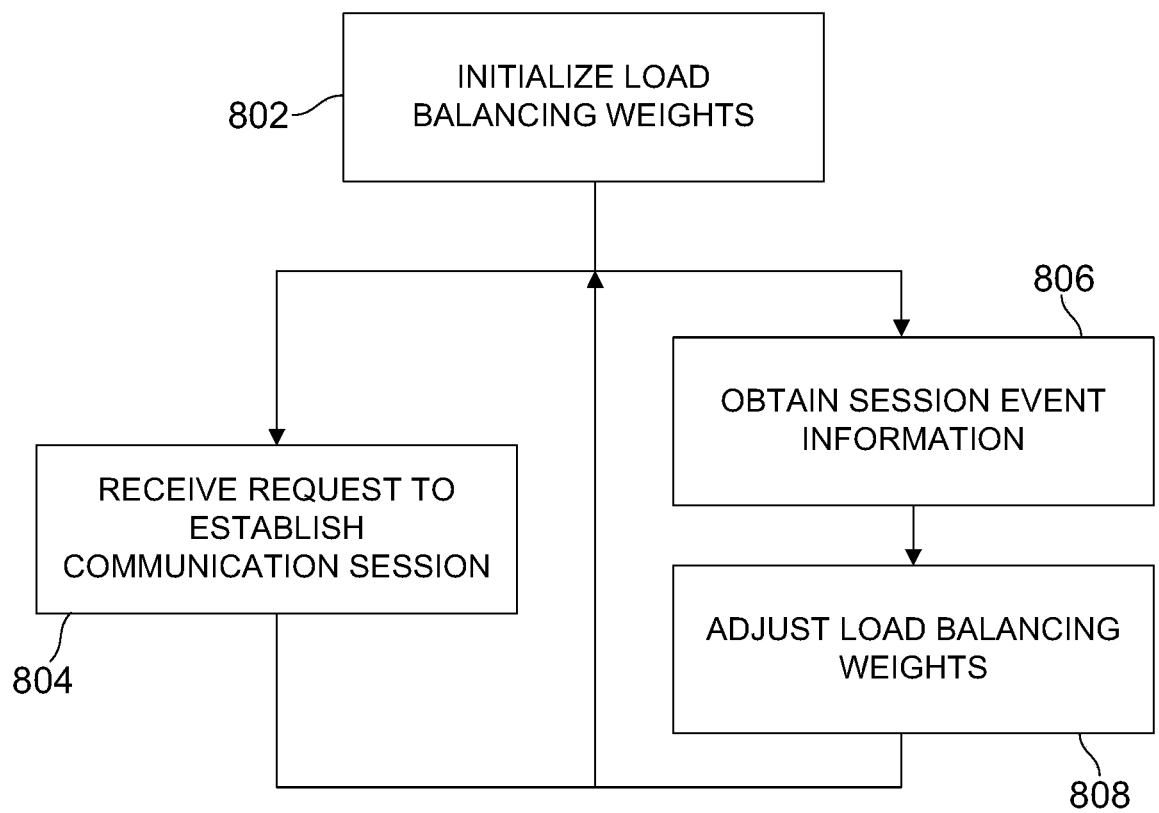
FIG. 8 illustrates an example flow for adjusting load balancing weights based on event information in accordance with certain embodiments.

FIG. 8 illustrates an example flow for adjusting load balancing weights based on event information in accordance with certain embodiments. The operations of the flow may be performed by any suitable network elements, such as NSLBRA 134 or NSLB 550 and RA 552.

At 802, load balancing weights are initialized. In various embodiments, the load balancing weights may be utilized by a load balancer implemented by NSLBRA 134 or NSLB 550 during selection of one or more network elements for a communication session. In particular embodiments, multiple sets of load balancing weights may be utilized where each set of load balancing weights is associated with a particular type of network element (e.g., PGS, SGW, etc.) and each load balancing weight is used to determine how frequently a particular network element is assigned to a session. For example, if four SGWs are available to service new sessions and the set of SGWs has associated load balancing weights of 0.2, 0.25, 0.25, and 0.30, then a first SGW may be assigned roughly twenty percent of new sessions, a second SGW may be assigned roughly twenty-five percent of new sessions, a third SGW may be assigned roughly twenty-five percent of new sessions, and a fourth SGW may be assigned roughly thirty percent of new sessions. In various embodiments, the load balancing weights may be used in conjunction with other factors or after other factors are determined not to be applicable (e.g., after a determination that the UE requesting the session does not already has an active session) to direct the selection of network elements.

The load balancing weights may be initialized to any suitable values. For example, the load balancing weights of a set may initially be set to equal values. As another example, the load balancing weights of a set may be initialized based on expected usage, capacity, and/or other characteristics associated with the network elements.

After the load balancing weights are initialized, network element(s) may be assigned based on the load balancing weights at 804. In parallel, session event information may be obtained at 806. The session event information may be based on any suitable session establishment events, mid-session events, and/or end-session events. At 808, the load balancing weights may be adjusted based on the session event information. For example, if the session event information indicates that a particular network element is getting overloaded, the load balancing weight associated with that particular network element may be adjusted to a lower value and one or more load balancing weights of the other network elements associated with the set may be adjusted upwards. These operations may repeat any suitable number of times and may provide dynamic load balancing weight adjustment based on session establishment, mid-session, and/or end-session event information.

Some of the operations illustrated in FIG. 8 may be repeated, combined, modified or deleted where appropriate, and additional operations may also be included. Additionally, operations may be performed in any suitable order without departing from the scope of particular embodiments.

Figure 9:
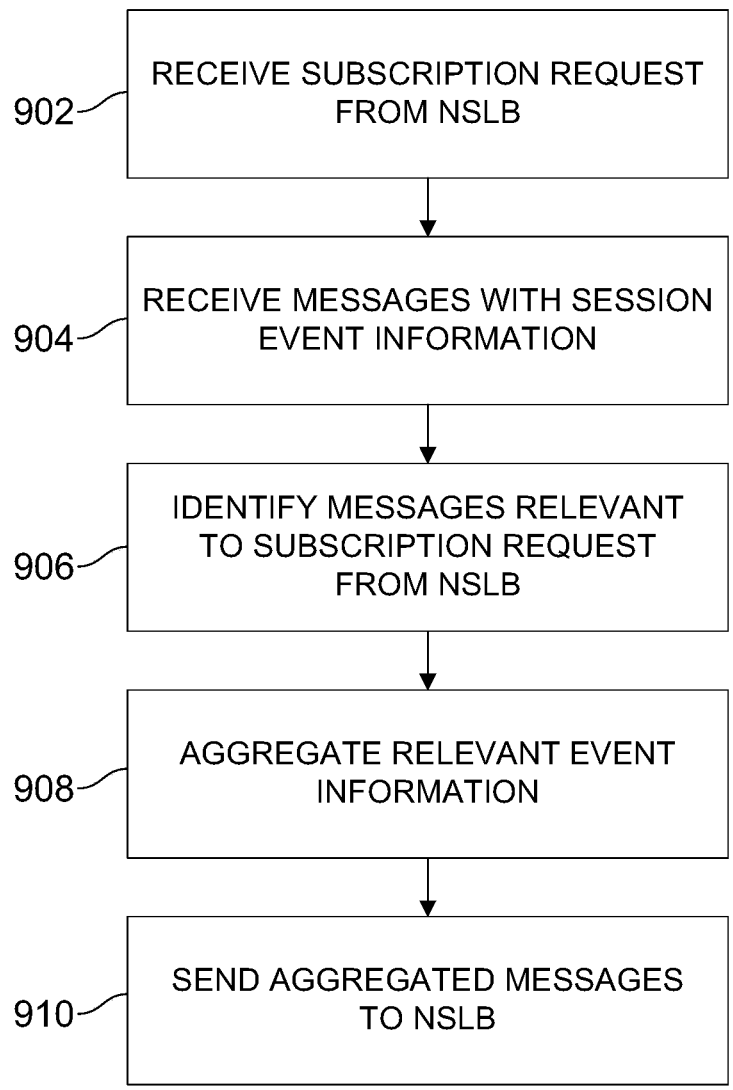
FIG. 9 illustrates an example flow for communicating event information in accordance with certain embodiments.

FIG. 9 illustrates an example flow for communicating event information in accordance with certain embodiments. The operations of the flow may be performed by any suitable network elements, such as a routing agent of NSLBRA 134 or RA 552.

At 902, a subscription request is received from an NSLB (e.g., an NSLB of NSLBRA 134 or NSLB 550). The subscription request may indicate event information that is of interest to the NSLB. At 904, messages with session event information are received. At 906, messages that are relevant to the subscription request from the NSLB are identified. For examples, messages that include event information that matches the requested information of the subscription request may be identified.

At 908, relevant event information from the received messages is aggregated. For example, the received messages may be aggregated into one or more larger messages. As another example, the relevant event information may be extracted from the messages and aggregated into one or more messages. At 910, the aggregated information is sent to the NSLB.

Some of the operations illustrated in FIG. 9 may be repeated, combined, modified or deleted where appropriate, and additional operations may also be included. Additionally, operations may be performed in any suitable order without departing from the scope of particular embodiments.

Although various examples described herein have focused on the LTE core networks, the features of the various embodiments may be used with any suitable cellular networks (such as a 3G network) that is capable of session establishment for a client computing device.

It is also important to note that the operations in FIGS. 6-9 illustrate only some of the possible scenarios that may be executed by, or within, the devices described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by the devices in that any suitable arrangements, chronologies, configurations, and timing mechanisms may be provided without departing from the teachings of the present disclosure.

Additionally, it should be noted that with the examples provided above, interaction may be described in terms of one or more devices. However, this has been done for purposes of clarity and example only. In certain cases, it may be easier to describe one or more of the functionalities of a given set of flows by only referencing a limited number of devices. It should be appreciated that the systems described herein are readily scalable and, further, can accommodate a large number of components, as well as more complicated/sophisticated arrangements and configurations. Accordingly, the examples provided should not limit the scope or inhibit the broad techniques disclosed herein, as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    obtaining, by a first network element comprising processing logic, notification of a first post-establishment event associated with a first communication session, wherein the first communication session relates to a first client computing device, wherein the first post-establishment event comprises at least one of a mid-session event and an end-session event, and wherein the first post-establishment event is communicated to a routing agent using a first communication protocol;
    determining, based on the first post-establishment event, state information identifying a first plurality of network elements involved in the first communication session;
    storing the state information;
    receiving, by the first network element, a request via a second communication protocol for a second communication session to be established for the first client computing device;
    retrieving the state information based on the request for the second communication session to be established;
    selecting, by the first network element, one or more network elements from the first plurality of network elements for the second communication session based on the retrieved state information; and
    communicating, by the first network element, identification information of the one or more network elements selected for use in the second communication session.

2. The method of claim 1, wherein the one or more network elements for the second communication session are selected prior to establishment of the second communication session for the client computing device.

3. The method of claim 1, wherein the one or more network elements for the second communication session are selected after establishment of the second communication session for the client computing device for a migration of the second communication session to the one or more network elements.

4. The method of claim 1, wherein:
    the first communication protocol is a Diameter-based communication protocol; and
    the second communication protocol is a General Packet Radio Service (GPRS) Tunneling Protocol (GTP)-based communication protocol.

5. The method of claim 4, wherein:
    the first network element comprises the routing agent, the routing agent to communicate using the Diameter-based communication protocol; and
    the first network element further comprises a load balancer to communicate using the GTP-based communication protocol.

6. The method of claim 1, further comprising sending, by the first network element to the routing agent, a message to subscribe to events associated with the communication sessions.

7. The method of claim 1, wherein the first network element is not included in a user plane of the first communication session.

8. The method of claim 1, further comprising identifying the first post-establishment event based on one or more messages received over a Gx interface between a packet data network gateway (PGW) and a Policy and Charging Rules Function (PCRF).

9. The method of claim 1, wherein the first post-establishment event comprises a mobility event.

10. The method of claim 1, wherein the one or more network elements selected based on the first post-establishment event comprise a packet data network gateway (PGW).

11. An apparatus comprising:
    a first communication interface comprising a transmitter and a receiver, the first communication interface configured to communicate using a first communication protocol to obtain notification of a first post-establishment event associated with a first communication session, wherein the first communication session relates to a first client computing device, wherein the first post-establishment event comprises at least one of a mid-session event and an end-session event;
    a second communication interface comprising a transmitter and a receiver, the second communication interface configured to:
        receive a request via a second communication protocol for a second communication session to be established for the first client computing device; and
        communicate identification information of one or more network elements selected for use in the second communication session; and processing logic comprising at least one processor, the processing logic configured to perform an operation, the operation comprising:
  determining, based on the first post-establishment event, state information identifying a first plurality of network elements involved in the first communication session;
  storing the state information;
  retrieving the state information based on the request for the second communication session to be established; and
  selecting at least one of the one or more network elements from the first plurality of network elements for the second communication session based on the retrieved state information.

12. The apparatus of claim 11, wherein the one or more network elements for the second communication session are selected prior to establishment of the second communication session for the client computing device.

13. The apparatus of claim 11, wherein the one or more network elements for the second communication session are selected after establishment of the second communication session for the client computing device for a migration of the second communication session to the one or more network elements.

14. The apparatus of claim 11, further comprising:
  a routing agent to communicate using a Diameter-based communication protocol; and
  a load balancer to communicate using a GTP-based communication protocol, wherein:
    the first communication protocol is the Diameter-based communication protocol; and
    the second communication protocol is the GTP-based communication protocol.

15. At least one computer-readable non-transitory media comprising one or more instructions that when executed by a processor cause performance of operations comprising:
  obtaining, by a first network element comprising processing logic, notification of a first post-establishment event associated with a first communication session, wherein the first communication session relates to a first client computing device, wherein the first post-establishment event comprises at least one of a mid-session event and an end-session event, and wherein the first post-establishment event is communicated to a routing agent using a first communication protocol;
  determining, based on the first post-establishment event, state information identifying a first plurality of network elements involved in the first communication session;
  storing the state information;
  receiving, by the first network element, a request via a second communication protocol for a second communication session to be established for the first client computing device;
  retrieving the state information based on the request for the second communication session to be established;
  selecting, by the first network element, one or more network elements from the first plurality of network elements for the second communication session based on the retrieved state information; and
  communicating, by the first network element, identification information of the one or more network elements selected for use in the second communication session.

16. The media of claim 15, wherein the one or more network elements for the second communication session are selected prior to establishment of the second communication session for the client computing device.

17. The media of claim 15, wherein the one or more network elements for the second communication session are selected after establishment of the second communication session for the client computing device for a migration of the second communication session to the one or more network elements.

18. The media of claim 15, wherein:
  the first communication protocol is a Diameter-based communication protocol; the second communication protocol is a GTP-based communication protocol;
  the first network element comprises the routing agent, the routing agent configured to communicate using the Diameter-based communication protocol; and
  the first network element further comprises a load balancer configured to communicate using the GTP-based communication protocol.

* * * * *